W. V. DUBOIS.
Knitting Machine Register.
No. 90,435.
Patented May 25, 1869.
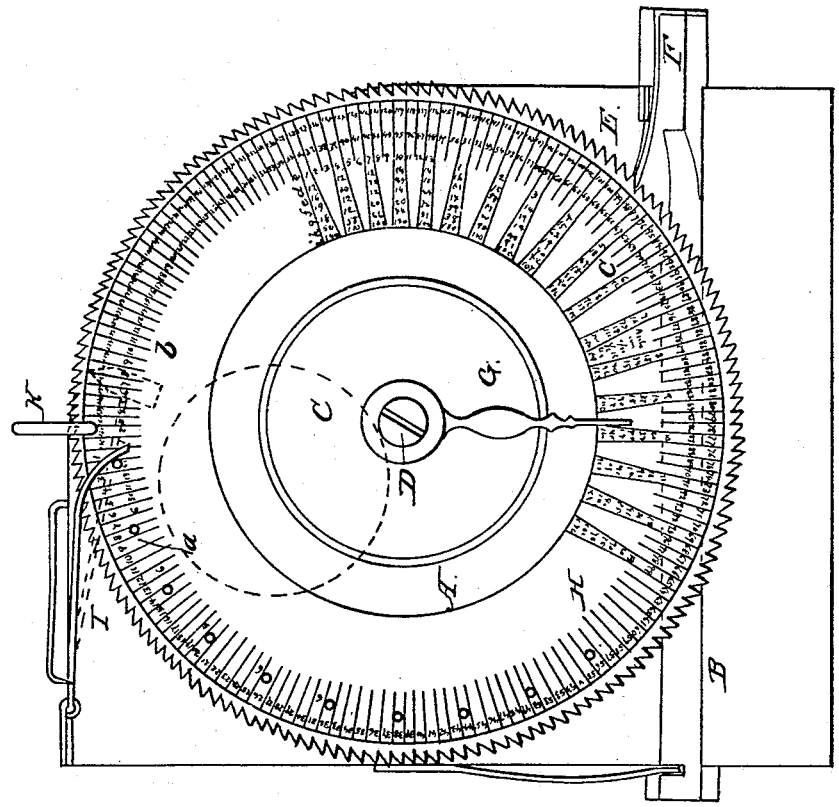
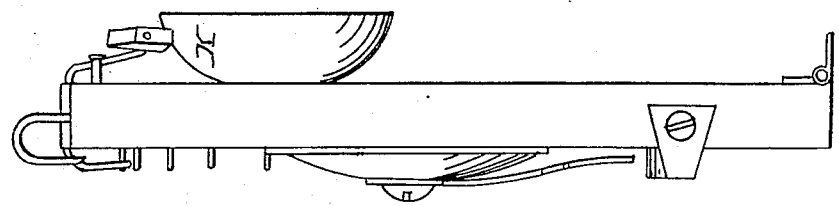

UNITED STATES PATENT OFFICE.

WILLIAM V. DUBOIS, OF COVINGTON, INDIANA, ASSIGNOR TO HIMSELF AND W. A. AND J. G. SANGSTER, OF SAME PLACE.

IMPROVEMENT IN KNITTING-MACHINE REGISTER.

Specification forming part of Letters Patent No. 90,435, dated May 25, 1869.

*To all whom it may concern:*

Be it known that I, WILLIAM V. DUBOIS, of Covington, in the county of Fountain and State of Indiana, have invented a new and useful Improvement in Knitting-Machine Register; and I do hereby declare that the following is a full, clear, and exact description thereof, which will enable others skilled in the art to make and use the same, reference being had to the accompanying drawings, forming part of this specification, in which—

Figure 1 represents a front elevation of my improved register, and Fig. 2 represents a side elevation of the same.

Similar letters of reference indicate like parts.

The object of this invention is to provide a register whereby the number of revolutions of the machine necessary for forming the different parts of socks may be indicated when accomplished, the said register being set according to a scale previously prepared and used in connection with it, the said scale indicating the variations in the numbers of revolutions of the said machine necessary for forming the different parts of hose of all numbers or sizes.

It consists in the peculiar arrangement of parts to be hereinafter described. It is, however, more particularly adapted to the Lamb knitting-machine. The said disk is provided with the scale and a pointer, whereby it is properly set for operation, and with pins for actuating the stem of a bell-hammer, to notify the operator when a sufficient number of rounds has been knit, when he makes the necessary change to reset it for the next operation.

In the drawing, A represents a disk suitably clamped to a table, B, by an oval plate, C, and axial bolt D, which is provided with a scale on its face, and with ratchet-teeth on its periphery, whereby it is intermittently rotated by a spring-pawl, E, on the slide F, which works in a groove in the table B, and is actuated by any reciprocating part of the machine to which it is to be attached, so as to have one movement to one revolution of the said machine. G represents a pointer to be used in setting the disk by the scale. H represents pins for actuating the bell-hammer rod I, and K represents the bell.

*a* in the scale represents a row of figures, numbering the ratchet-teeth, running toward the left. *b* represents a second row for the same purpose, running in the other direction part of the way around; and *c* represents a third row, representing the various sizes of hose required.

The row *d* indicates the number of needles to be set up to start the toe with for the several numbers in the row *c*. The row *e* indicates the number of revolutions necessary for forming the foot. The row *f* indicates the number of revolutions necessary for forming the heel. The row *g* indicates the number of revolutions necessary for forming the ankle and leg, and the rows *h* and *i* indicate the numbers for the lengths of socks or stockings.

To use the register, set the hand to the number of sock or stocking required, say number 8; then turn the disk until the hand points to the gage-wire K at the top, when, the toe having already been formed, the machine may be set in motion until the bell rings, when seventy-nine rounds will have been formed, which is the number necessary for forming the foot for that number of hose; then set the disk back until the number 15 of the second row, which is the number of revolutions required, according to the scale, to form the heel, and set in motion again until the bell rings; then set again the scale so as to bring the number 40 of the second row opposite the pointer, which is the number of revolutions, according to the scale, to form the ankle for the said number of stocking, and operate till the bell rings by the action of the first pin H of the row, when, for knitting the leg, the needles may be increased by two for widening, and the knitting proceeded with, widening each time as the bell is struck by all of the pins H, continuing until the number 96 of the first row arrives at the pointer for socks, and for long hose continue to the number 170, or a little more than a whole revolution of the disk. The operation will be the same for socks or stockings of all sizes, varying according to the number.

Having thus described my invention, I claim as new and desire to secure by Letters Patent—

The herein-described arrangement of the disk A, provided with the ratchet-teeth, the scale, the pointer G, and the pins H, the oval plate C, grooved table B, slide F, spring-pawl E, and the alarm mechanism, as herein described, for the purpose specified.

WILLIAM V. DUBOIS.

Witnesses:
H. C. PATTERSON,
WM. N. WILLIS.